US012623216B2

(12) United States Patent　　(10) Patent No.: US 12,623,216 B2
Kim et al.　　(45) Date of Patent: May 12, 2026

(54) METHOD OF FABRICATING BLOCK-COPOLYMER-BASED 3D POLYMORPHIC ARTIFICIAL BILAYER MEMBRANE STRUCTURE

(71) Applicant: KOREA INSTITUTE OF SCIENCE AND TECHNOLOGY, Seoul (KR)

(72) Inventors: Tae Song Kim, Seoul (KR); Dong Hyun Kang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 705 days.

(21) Appl. No.: 17/992,084

(22) Filed: Nov. 22, 2022

(65) Prior Publication Data

US 2023/0271179 A1　Aug. 31, 2023

(30) Foreign Application Priority Data

Feb. 25, 2022　(KR) ........................ 10-2022-0024927

(51) Int. Cl.
C08J 3/075　(2006.01)
B01L 3/00　(2006.01)
C08L 53/00　(2006.01)

(52) U.S. Cl.
CPC ......... B01L 3/502707 (2013.01); C08J 3/075 (2013.01); C08L 53/00 (2013.01); (Continued)

(58) Field of Classification Search
CPC ....... B01L 3/502707; B01L 2300/0829; B01L 2300/12; B01L 2300/16; B01L 3/5085; (Continued)

(56) References Cited

FOREIGN PATENT DOCUMENTS

KR　　10-1913342 B1　10/2018

OTHER PUBLICATIONS

Kang, Tunable and scalable fabrication of block copolymer-based 3D polymorphic artificial cell membrane array, Nature Communications | (2022) 13:1261. (Year: 2022).*
(Continued)

*Primary Examiner* — Christine T Mui
(74) *Attorney, Agent, or Firm* — NSIP Law

(57) ABSTRACT

The present invention relates to a method for manufacturing a three-dimensional structure based on a block copolymer. The method comprises the steps of injecting a block copolymer (BCP) solution into each micro-well formed on the substrate and drying it to form a block copolymer layer, and applying a buffer to the block copolymer layer to hydrate the micro-well in three dimensions Forming the structure, after the three-dimensional structure is formed, injecting and curing a hydrogel solution around the three-dimensional structure may include the step of enhancing stability. In particular, the process of hydration by applying a buffer to the micro-well is performed while an electric field is applied. By controlling the concentration of the block copolymer (BCP) and the amplitude and frequency of the electric field, a three-dimensional artificial cell membrane having a desired size and shape, such as a spherical or ciliary shape and high stability (100% survival for 50 days) is manufactured can do. The present invention can be efficiently applied to various biological fields such as artificial cells, cell-mimicking biosensors, and bioreactors.

10 Claims, 9 Drawing Sheets
(3 of 9 Drawing Sheet(s) Filed in Color)

(52) U.S. Cl.
CPC ... *B01L 2300/0829* (2013.01); *B01L 2300/12* (2013.01); *B01L 2300/16* (2013.01); *C08J 2353/00* (2013.01)

(58) Field of Classification Search
CPC .............. B01L 2200/0647; C08J 3/075; C08J 2353/00; C08L 53/00; B29C 2035/0827; B29C 33/424; B29C 39/26; B29C 39/42; B29L 2031/756; B01J 19/0093; B01J 2219/00788
USPC ................................................ 422/566, 500
See application file for complete search history.

(56) References Cited

OTHER PUBLICATIONS

Kang, Xinqi, et al. "One-pot species release and nanopore detection in a voltage-stable lipid bilayer platform." *Nano Letters* vol. 19 Issue 12 (Nov. 14, 2019): pp. 9145-9153.
Dearer, David, et al. "Three decades of nanopore sequencing." *Nature biotechnology* vol. 34 Issue 5 (May 6, 2016): pp. 518-524, Author Manuscript, pp. 1-18.

* cited by examiner

【FIG. 1】
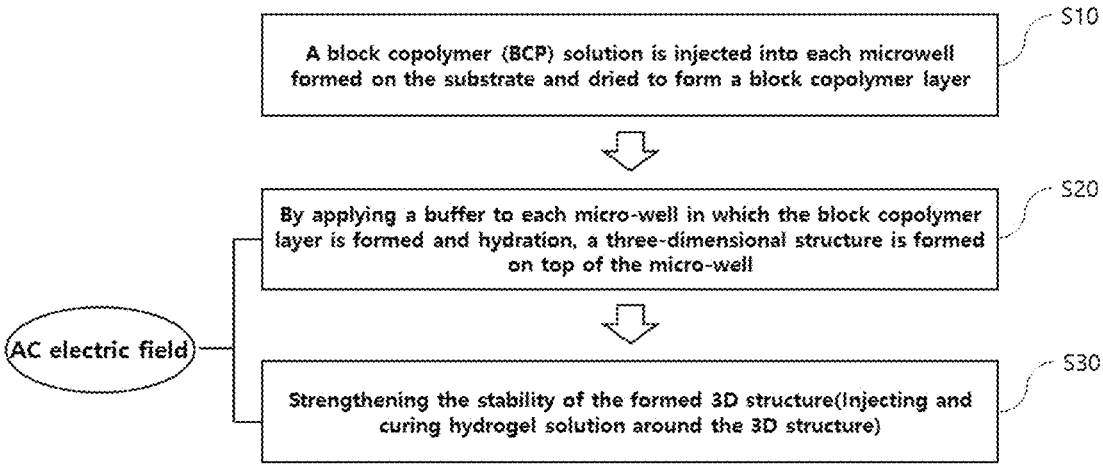
【FIG. 2】
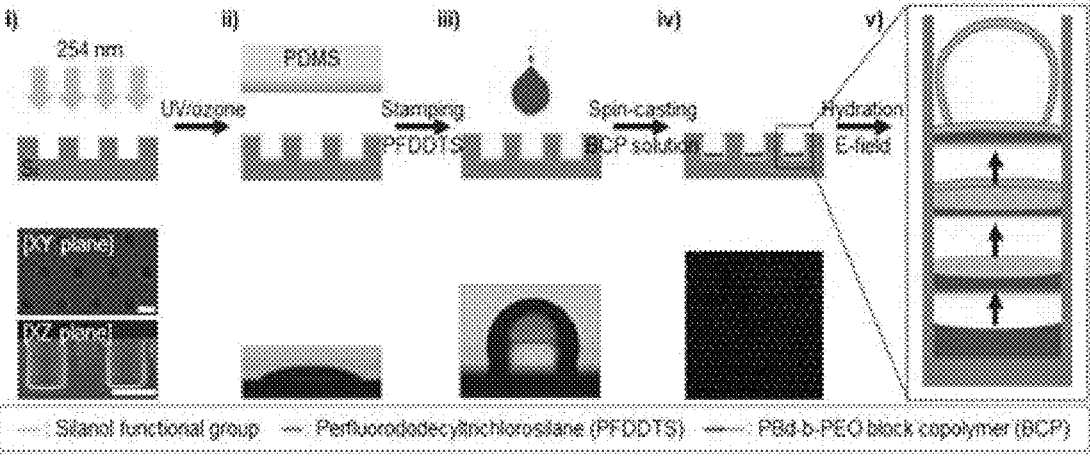

【FIG. 3】
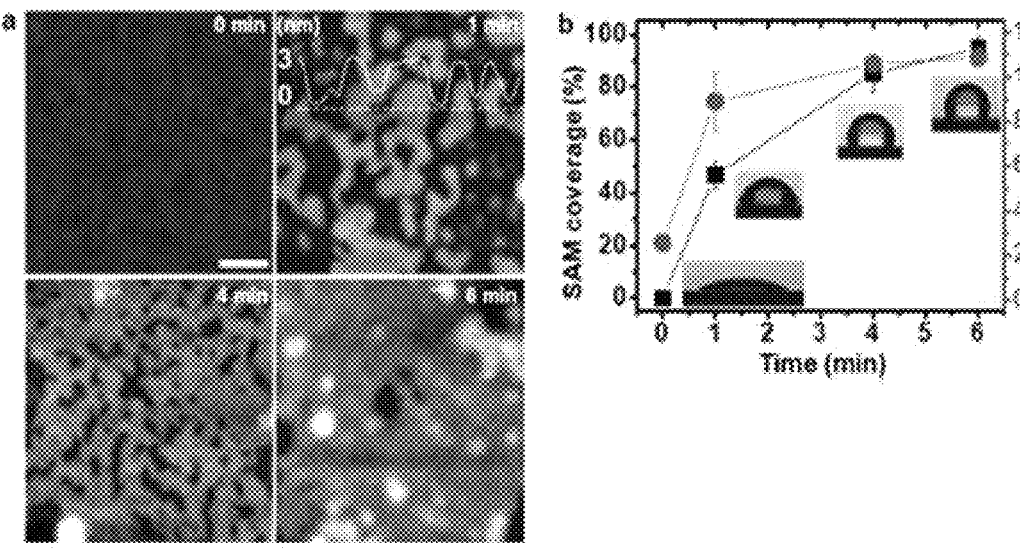
【FIG. 4】
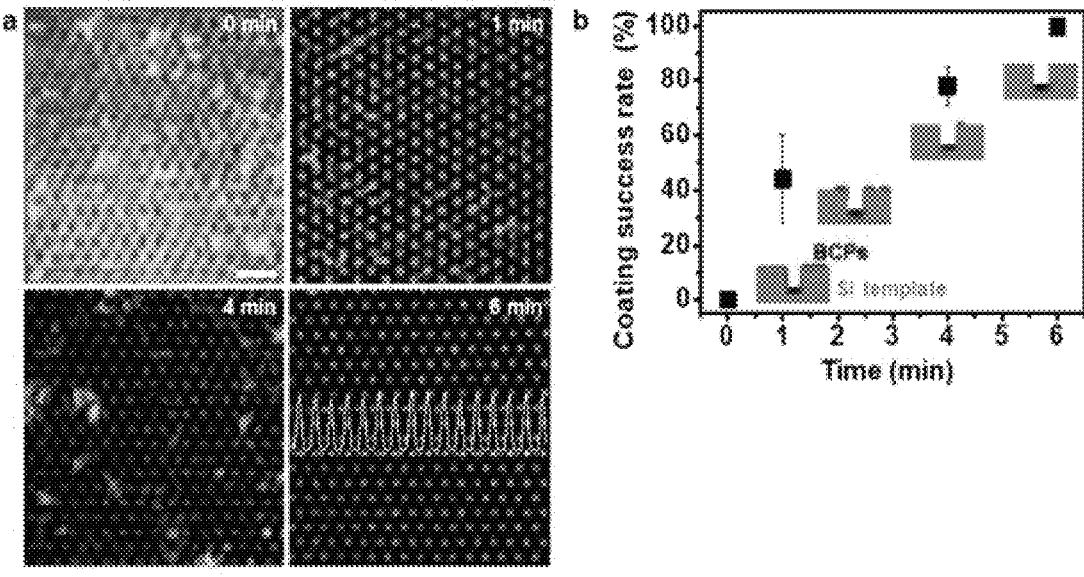

【FIG. 5】
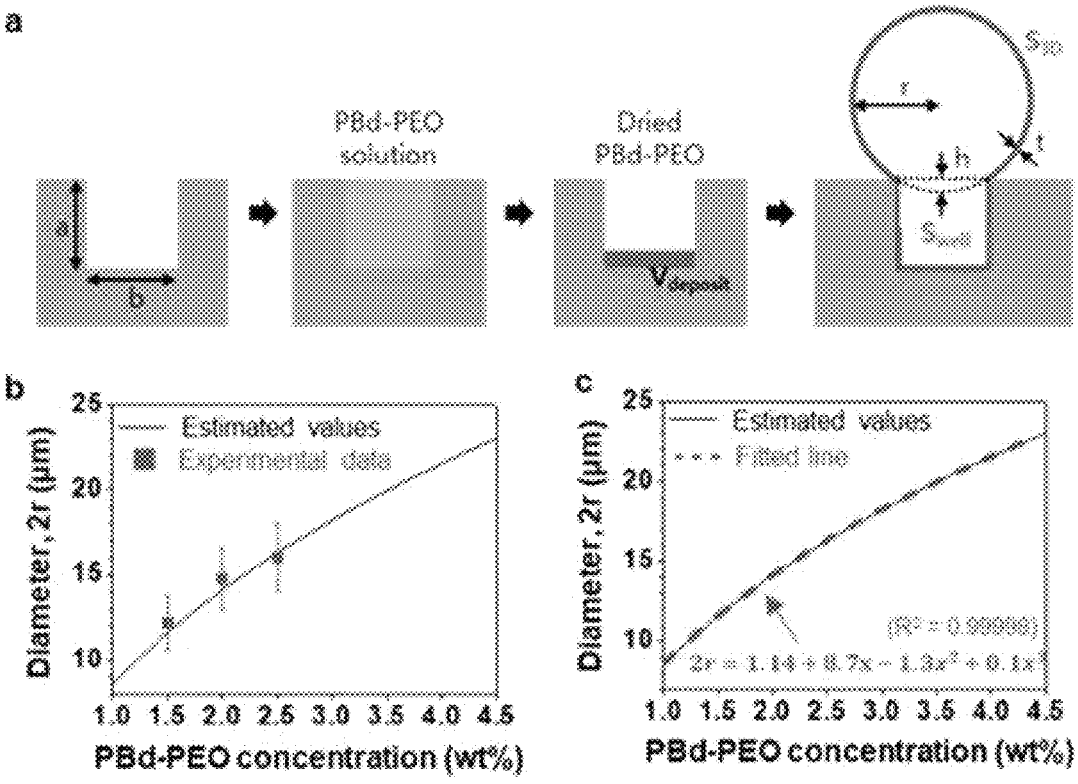
【FIG. 6】
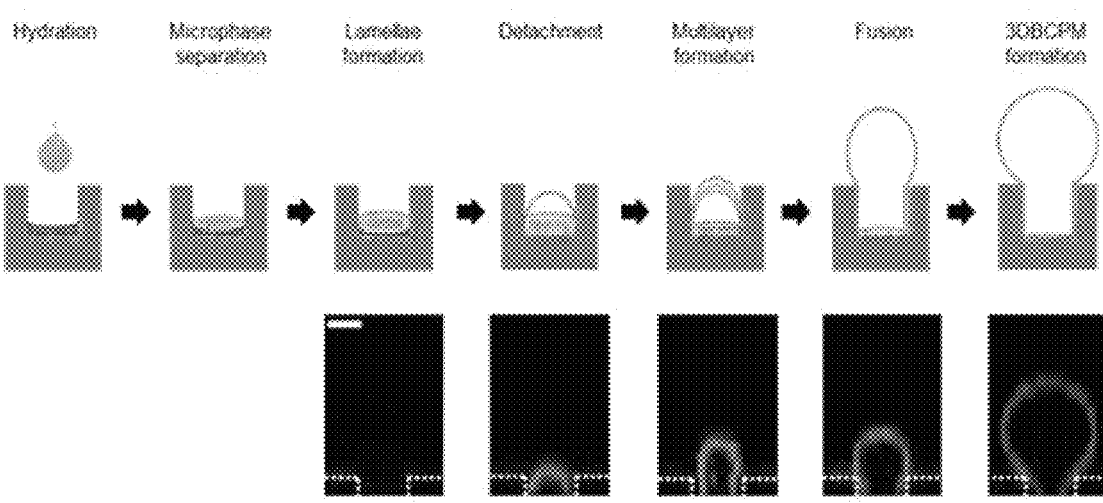

【FIG. 7】
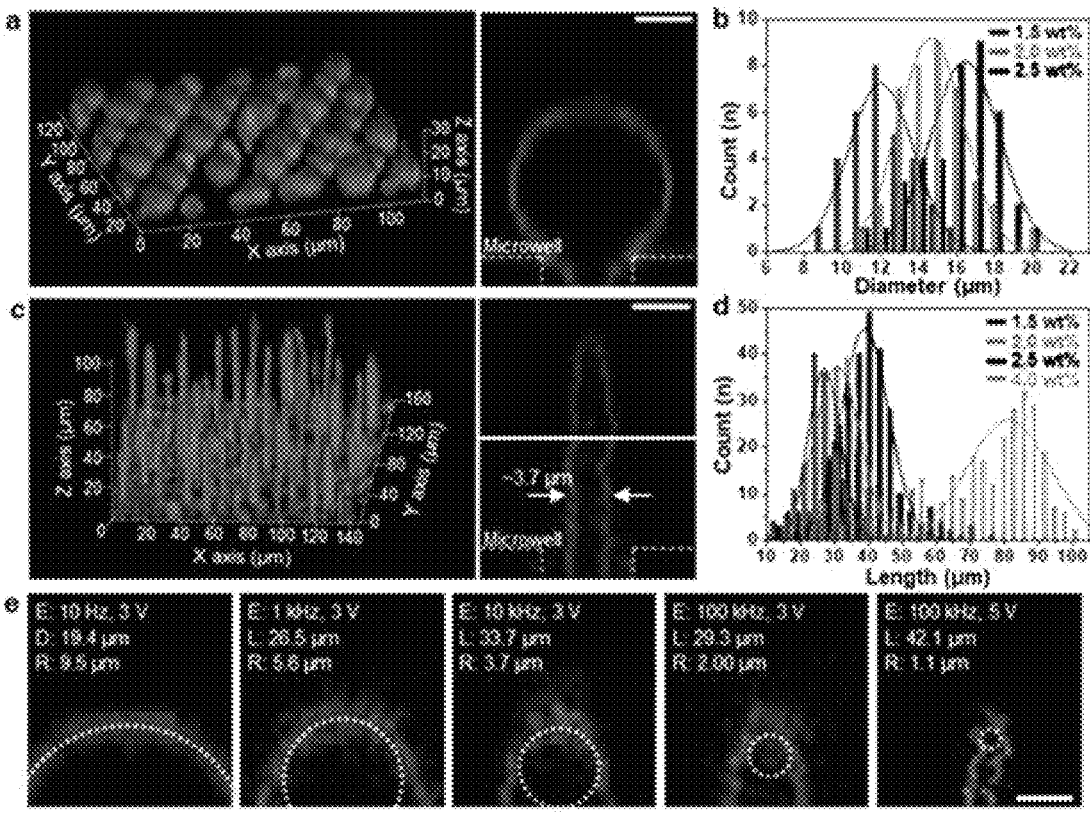

【FIG. 8】
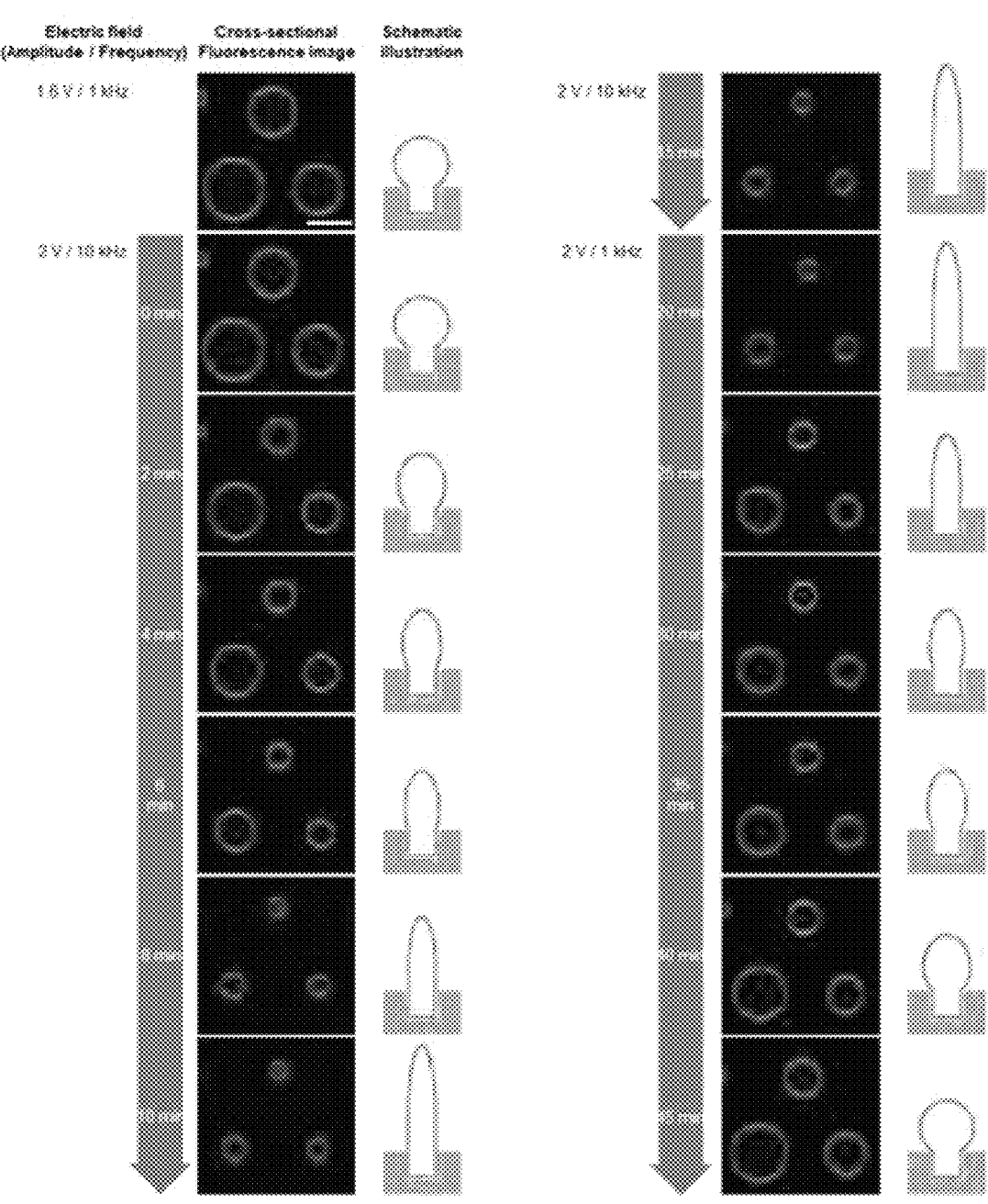

【FIG. 9】
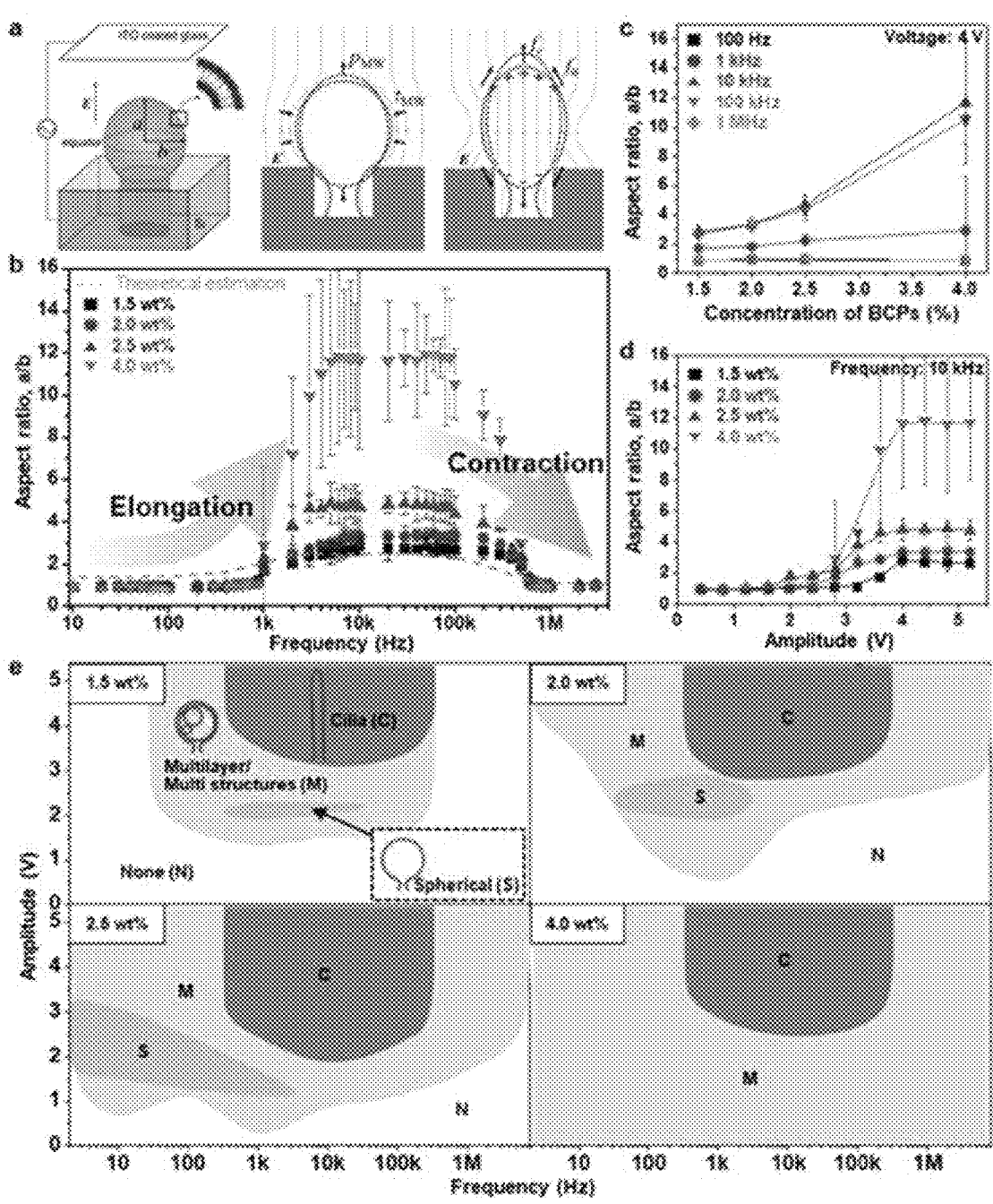

【FIG. 10】
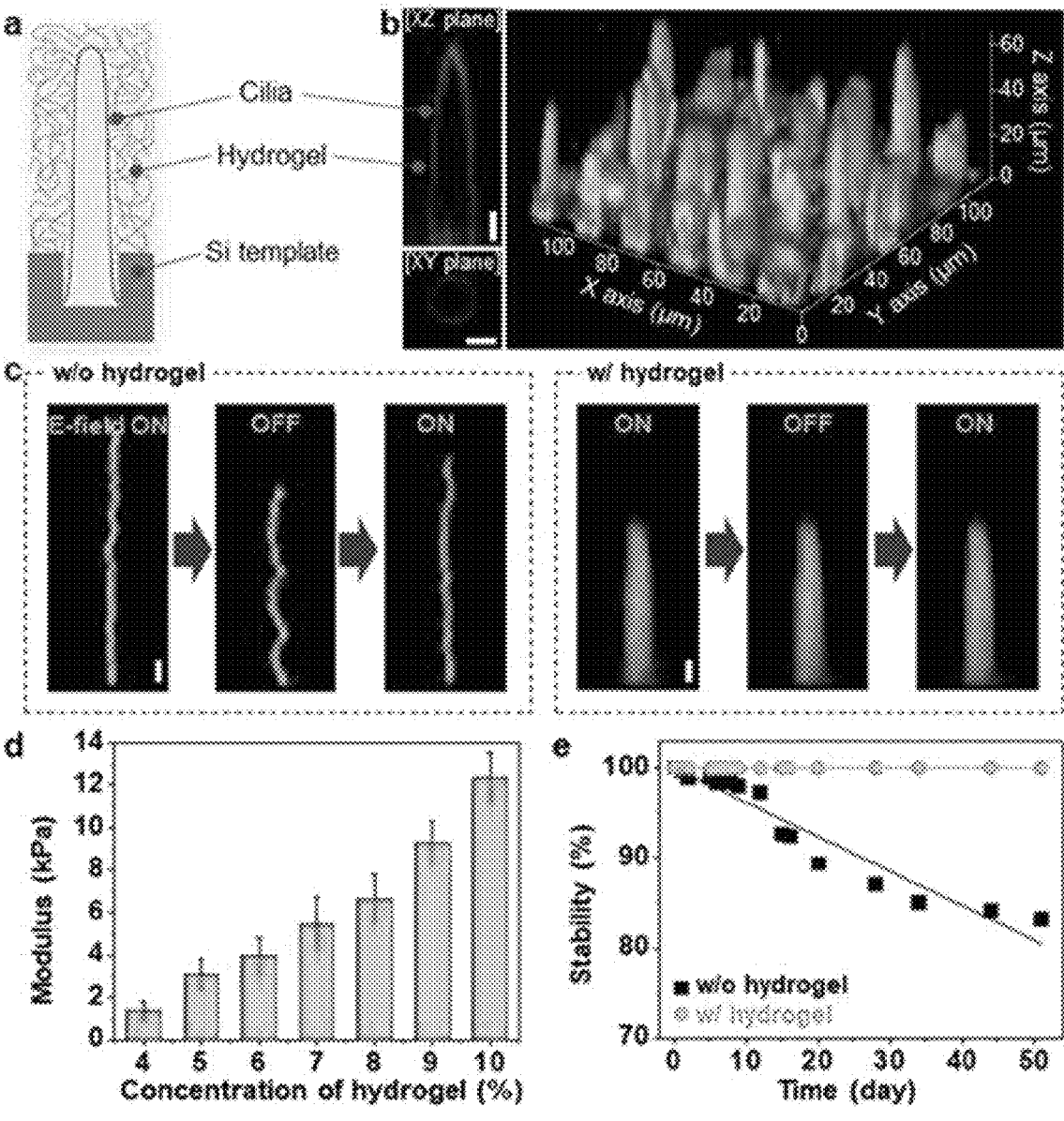

【FIG. 11】
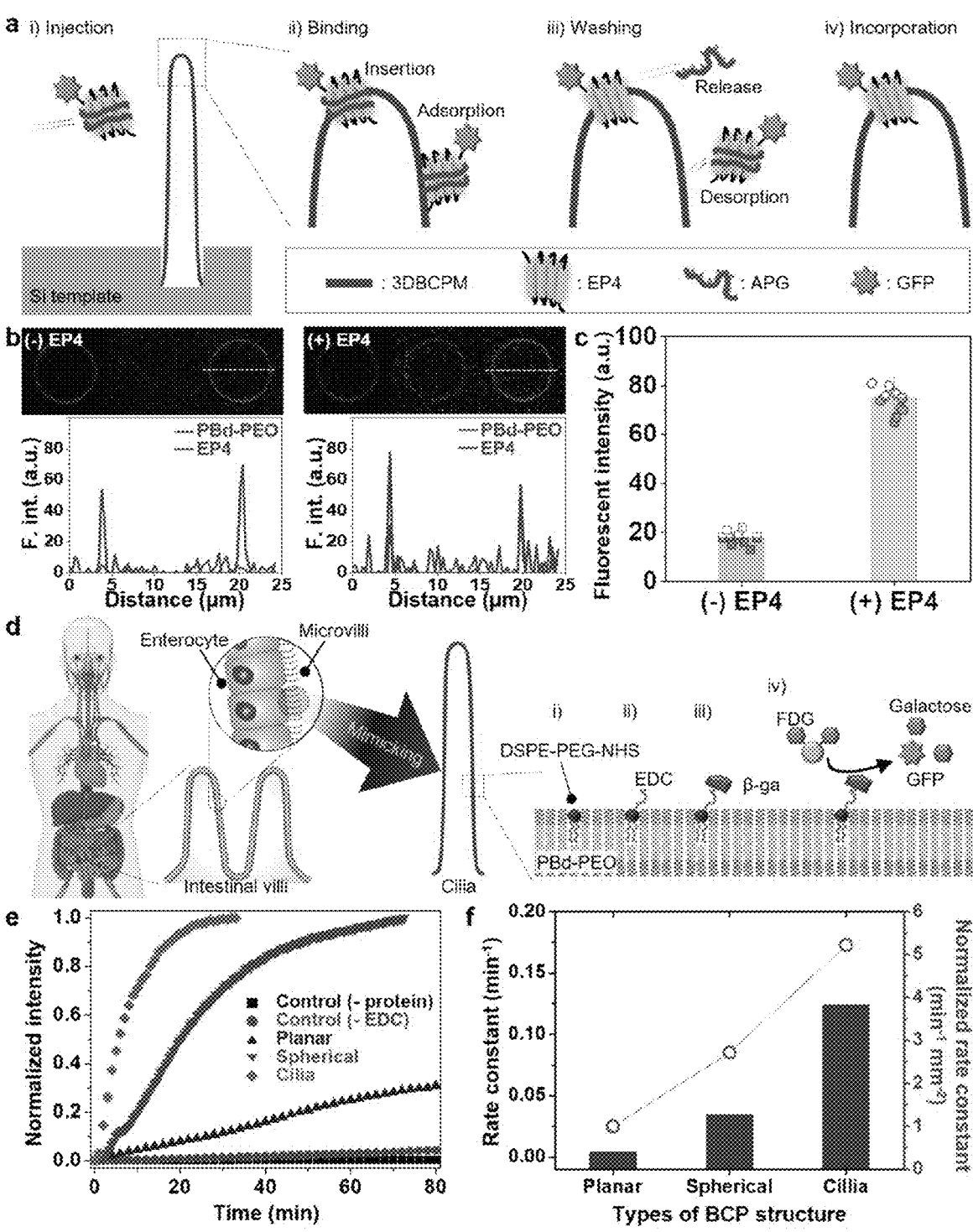

【FIG. 12】
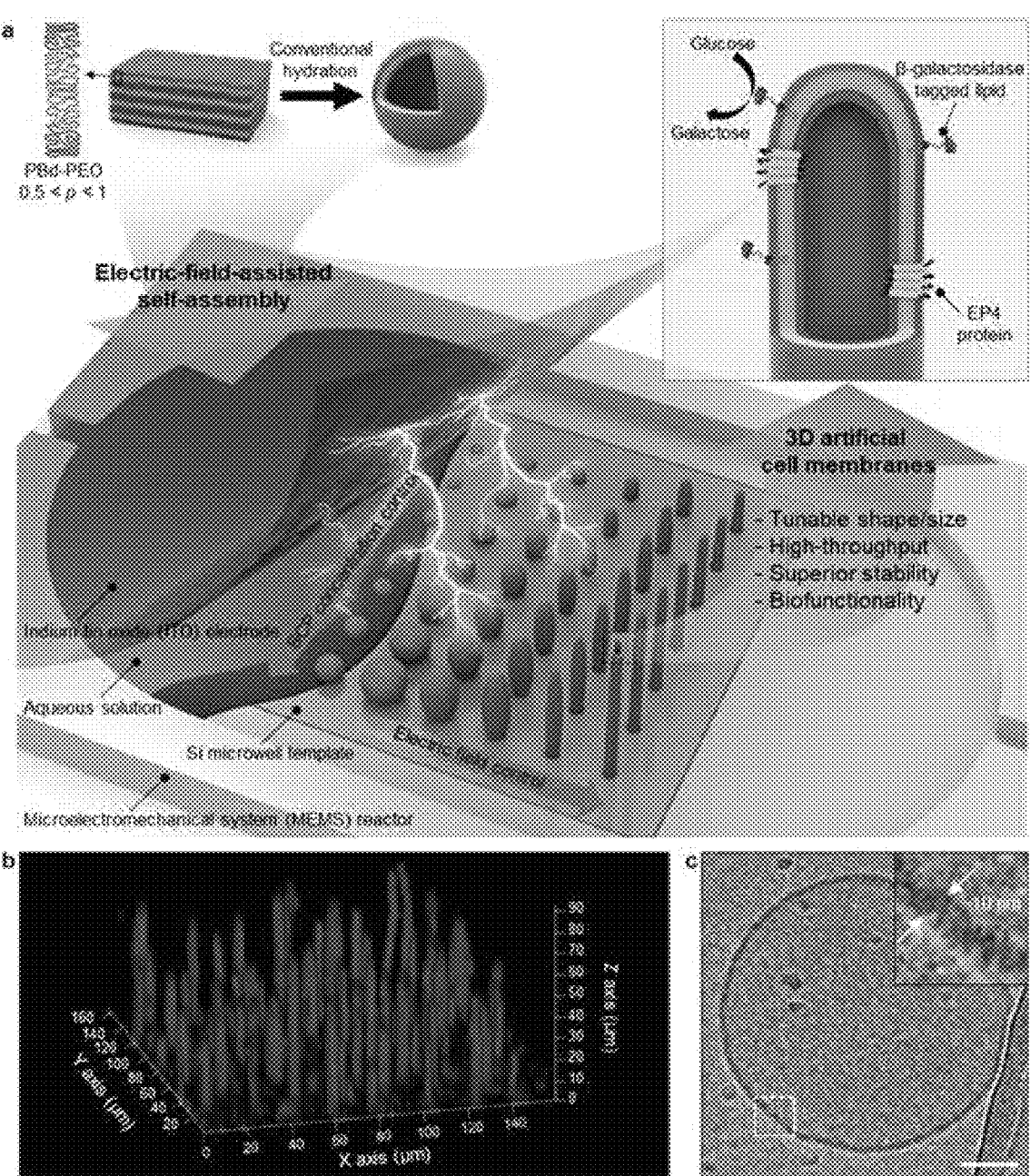

METHOD OF FABRICATING BLOCK-COPOLYMER-BASED 3D POLYMORPHIC ARTIFICIAL BILAYER MEMBRANE STRUCTURE

CROSS-REFERENCE TO RELATED APPLICATIONS

This application claims the benefit under 35 USC 119(a) of Korean Patent Application No. 10-2022-0024927 filed on Feb. 25, 2022, in the Korean Intellectual Property Office, the entire disclosure of which is incorporated herein by reference for all purposes.

TECHNICAL FIELD

The present invention relates to a method of fabricating a 3D structure based on a block-copolymer, and more particularly, it relates to a method capable of manufacturing a 3D artificial structure having various sizes and shapes and high stability by controlling the concentration of the block copolymer and the amplitude and frequency of the electric field.

BACKGROUND OF THE INVENTION

Cells perform functions to maintain life phenomena, such as sensing and regulating extracellular changes, and communication inside and outside the cell. The core of this function consists of a double membrane with a thickness of about 5 to 10 nm and a membrane protein including ion channel, pore forming protein/peptide or other synthetic pores.

Recent research has been conducted to fabricate a double membrane mimicking the function and structure of a cell, and apply it to a biosensor by combining channel membrane proteins or biological nanopores. A company called OXFORD NANOPORE TECHNOLOGIES (nanoporetech.com) in the UK has combined protein nanopores with a two-dimensional planar polymer membrane, and then they are commercializing a fluid chip that can record the single-molecule DNA sequence moving through the pore at high speed in real-time by applying an electric field between the top and bottom of the membrane. (D. Deamer et al., nature biotechnology, Vol. 34, No. 5, p. 518~524, 2016, X. Kang et al., Vol. 29, 9145~9153, 2019).

However, an attempt to apply an artificial cell membrane based on the biological double membrane or an amphiphilic block copolymer double membrane is a two-dimensional planar structure on a specific substrate. However, the shape of the cell is usually a spherical or an irregular shape rather than a planar shape, including a curved surface.

Accordingly, attempts are being made for three-dimensional manufacturing rather than flat. As an example, Korean Patent Registration No. 10-1913342 discloses a method of manufacturing a three-dimensional artificial biological membrane structure having a sufficient reaction area and high stability on a substrate using a lipid material, which is an actual cell membrane constituent material.

However, although this prior art can relatively simply manufacture a three-dimensional artificial biological membrane structure using a lipid material, it is difficult to manufacture a three-dimensional structure to have various desired sizes and shapes.

For example, when using a lipid material like the technique disclosed in Patent Registration No. 10-1913342, it is difficult to implement a narrow and long cilia-shaped structure. In addition, the prior art also has a problem in that it is difficult to stably maintain the manufactured three-dimensional structure for a long time.

Therefore, it is possible to manufacture 3D structures of various sizes and shapes suitable for imitation targets, such as spherical shapes as well as narrow and long cilia similar to real cells, and a technology that allows the manufactured 3D structures to be maintained robustly and stably for a more extended time development is required.

PRIOR ART

Patent

Korean Patent Registration 10-1913342 (3D lipid structure array manufacturing method and 3D lipid structure according thereto, Day of Grant: 2018 Oct. 30)

CONTENT OF THE INVENTION

Challenge to be Solved

Accordingly, the present invention has been devised to meet the above needs, it is an object to provide a method for manufacturing a 3D polymorphic artificial structure based on a block copolymer, which can manufacture a 3D structure with high stability of a desired size and shape by controlling the concentration of the block copolymer and the amplitude and frequency of the electric field to be.

Means of Solving the Problem

In order to achieve the above object, the block copolymer-based three-dimensional polymorphic artificial structure manufacturing method according to the present invention comprises a step of injecting a block copolymer (BCP) solution into each micro-well of a micro-well array formed on a substrate, and drying to form a block copolymer layer; and a step of forming a three-dimensional structure on top of the micro-well from the block copolymer layer by applying a buffer (hydration buffer) to each micro-well in which the block copolymer layer is formed to hydrate.

In this case, at least a part of the process of hydration by applying a buffer to each micro-well in which the block copolymer layer is formed may be performed while an electric field is applied between the upper and lower portions of the micro-well in which the block copolymer layer is formed.

The block copolymer may include PBd-PEO (polybutadiene-b-polyethylene oxide).

The buffer may include a sucrose solution of a certain concentration.

The size and shape of the three-dimensional structure may be determined by one or more of the concentrations of the block copolymer solution, the amplitude of the electric field, and the frequency of the electric field.

The method for manufacturing a three-dimensional polymorphic artificial structure based on a block copolymer according to the present invention may further include enhancing the stability of the formed three-dimensional structure.

The step of enhancing the stability of the three-dimensional structure may include injecting and curing a hydrogel solution around the three-dimensional structure after the three-dimensional structure is formed.

In this case, the process of injecting and curing the hydrogel solution around the three-dimensional structure may be performed in a state in which the electric field is applied.

The frequency of the electric field may be controlled to a value greater than or equal to the first frequency and less than or equal to the second frequency when the shape of the three-dimensional structure is manufactured in a ciliary shape.

In this case, the process of injecting and curing the hydrogel solution around the three-dimensional structure may be performed in a state in which the electric field is applied.

The frequency of the electric field may be controlled to a value greater than or equal to the first frequency and less than or equal to the second frequency when the shape of the three-dimensional structure is manufactured in a ciliary shape.

In addition, when the shape of the three-dimensional structure is manufactured in a spherical shape, a value less than the first frequency or greater than the second frequency may be controlled.

In the above, the ciliary shape refers to a shape with an aspect ratio of 1.5 or more, and 'first frequency<second frequency'.

The first frequency may be configured to include 1 kHz, and the second frequency to include 1 MHz.

Effects of the Invention

According to the present invention, through template-guided self-assembly, a three-dimensional block copolymer artificial cell membrane (3DBCPM) fixed at a predefined position can be fabricated in a controllable manner.

Topographically and chemically structured micro-well array templates on the substrate easily facilitate uniform patterning on block copolymers and can serve as a reactor for the effective growth of 3DBCPM.

The present invention can fabricate 3DBCPM having a desired size and shape and high stability (e.g., 100% survival for 50 days) by controlling the concentration of the block copolymer (BCP) and the amplitude and frequency of the electric field.

The 3DBCPM prepared according to the present invention can be efficiently applied to various biological fields such as artificial cells, cell-mimicking biosensors, and bioreactors.

BRIEF DESCRIPTION OF THE DRAWING

The patent or application file contains at least one drawing executed in color. Copies of this patent or patent application publication with color drawing(s) will be provided by the Office upon request and payment of the necessary fee.

FIG. 1 is a flowchart of an embodiment of a method for manufacturing a three-dimensional polymorphic artificial structure based on a block copolymer according to the present invention;

FIG. 2 is an example structurally explaining that a 3DBCPM array is formed in each micro-well that is topographically/chemically structured on a silicon substrate;

FIG. 3 is an example showing that the PFDDTS self-assembled monolayer (SAM) covers the entire surface;

FIG. 4 is an example showing that BCP patterning for each micro-well is well made;

FIG. 5 is an example illustrating the size of 3DBCPM in a microwell;

FIG. 6 is an example showing the mechanism of 3DBCPM growth when an electric field is applied to hydration;

FIG. 7 is an example showing that a uniform 3DBCPM array is formed in each microwell that is topographically/chemically structured on a silicon substrate;

FIG. 8 is an example showing the reversible shape transformation of 3DBCPM prepared with 2 wt % of PBd-PEO through electric field control;

FIG. 9 is an example for explaining the morphology of 3DBCPM in an electric field with different amplitudes and frequencies;

FIG. 10 is an example illustrating the structural and mechanical properties of 3DBCPM in the form of cilia supported by a hydrogel;

FIG. 11 is an example illustrating a biological application based on 3DBCPM as a platform;

FIG. 12 is an example for implicitly explaining 3DBCPM, which is manufactured according to the present invention and can be applied in various biological ways.

DETAILED DESCRIPTION OF THE INVENTION

Since the present invention can apply various transformations and can have various embodiments, specific embodiments are illustrated in the drawings and described in detail in the detailed description. However, this is not intended to limit the present invention to specific embodiments, and it should be understood that all modifications, equivalents and substitutes included in the subject matter and scope of the present invention are included.

In describing the present invention, if it is determined that a detailed description of a related known technology may obscure the gist of the present invention, the detailed description thereof will be omitted.

The terms used herein are only used to describe specific embodiments, and are not intended to limit the present invention. The singular expression includes the plural expression unless the context clearly dictates otherwise.

In the present application, terms such as "comprise" or "have" are intended to designate that a feature, number, step, operation, component, part, or combination thereof described in the specification exists, but one or more other features It should be understood that this does not preclude the existence or addition of numbers, steps, operations, components, parts, or combinations thereof.

Terms such as first, second, etc. may be used to describe various elements, but the elements should not be limited by the terms. The above terms are used only for the purpose of distinguishing one component from another.

FIG. 1 shows an embodiment of a method for manufacturing a three-dimensional polymorphic artificial structure based on a block copolymer according to the present invention; a block copolymer (BCP) solution is injected into the inside of each micro well constituting the micro well array and dried to form a block copolymer layer (S10), and a buffer (hydrated) in each micro well where the block copolymer layer is formed. Buffer solution) is applied to hydrate, thereby forming a three-dimension structure on top of the micro-well from the block copolymer layer (S20).

The micro-well array may consist of a plurality of micro-wells formed on a substrate, and a three-dimensional structure is manufactured using each micro-well.

The substrate is a support for forming three-dimensional structure of a block copolymer thereon, and is not particularly limited and includes all known in the art.

For example, the substrate may be a plate or a substrate including silicon.

The micro-wells provide a space for filling the block copolymer solution therein to form a block copolymer layer.

The shape, size, depth, etc. of the micro-well may be variously configured. For example, the micro-well may have a cylindrical shape and may have a rectangular cross-section, but is not limited thereto. A plurality of micro-wells may be arranged side by side at regular intervals on the substrate to constitute a micro-well array.

The block copolymer used to make the three-dimensional structure may be of various configurations. For example, the block copolymer may comprise PBd-PEO (polybutadiene-b-polyethyleneoxide), but is not limited thereto.

The block copolymer solution may include a block copolymer in a solvent, and a method of injecting and drying the block copolymer solution into each microwell is not particularly limited and may be variously configured.

A method of forming the block copolymer layer in the micro-well using the block copolymer solution in step S10 will be described later in detail.

The buffer, which is a hydration buffer, is for hydrating the block copolymer layer and may be configured in various ways. For example, the buffer may include a sucrose solution of a certain concentration, but is not limited thereto.

In particular, at least a part of the process of hydration by applying a buffer to each micro-well in which the block copolymer layer is formed in step S20 may be performed in a state in which an electric field is applied between the upper and lower portions of the micro-well in which the block copolymer layer is formed.

The block copolymer-based three-dimensional polymorphic artificial structure manufacturing method according to the present invention may further include the step (S30) of enhancing the stability of the three-dimensional structure formed in step S20.

Step S30 may be variously configured to enhance the stability of the three-dimensional structure. As a specific example, step S30 may include a process of injecting and curing a hydrogel solution around the three-dimensional structure after the three-dimensional structure is formed.

In this case, the process of injecting and curing the hydrogel solution around the three-dimensional structure may be performed in a state in which an electric field is applied.

In addition, for convenience of explanation, the block copolymer is used interchangeably with 'BCP', which is an abbreviation of block copolymer, and the substrate will be described as an example of a silicon (Si) substrate.

Now, each process of the present invention will be described in more detail with reference to the experimental examples and drawings in which the 3DBCPM was manufactured according to the present invention. The specific process in which this experiment was performed will be described later.

FIG. 2 shows an example in which a uniform 3DBCPM array is formed in a topographically/chemically structured silicon (Si) micro-well template.

FIG. 2 shows an example of the manufacturing process of 3DBCPM as follows; i) Scanning electron microscopy (SEM) images of Si microwell templates and surface termination with hydroxyl groups via ultraviolet (UV)/ozone treatment; ii) formation of fluorocarbon-based self-assembled monolayers (SAM) via microcontact printing and measurement of contact angle (CA) of UV/ozone-treated templates; iii) Separation of hydrophilic micro-wells by hydrophobic SAM regions and CA measurement of SAM-treated templates; iv) patterning of amphiphilic block copolymer (BCP) domains via spontaneous dehydration and fluorescence microscopy images of BCP-coated templates; v) Sequential process for formation of 3DBCPM through electric field assisted self-assembly upon hydration (scale bar: 10 μm)

In this case, i) to iv) show examples related to the process of forming the BCP layer in step S10, and v) shows examples related to the process of forming a three-dimensional structure by hydration in step S20.

Micro-well arrays fabricated from silicon (Si) templates provide limited space for the separation of BCPs and fusing of the expanded BCP layers.

In order to adjust the surface properties to be hydrophobic/oleophobic with microcontact printing technology, A self-assembled monolayer (SAM) of 1H,1H,2H,2H-perfluorododecyltrichlorosilane (PFDDTS) can be placed on the surface of a silicon template treated with UV/ozone as in the examples shown in ii) to iii).

As in the example shown in FIG. 3, after 6 minutes of printing, the self-assembled tomography (SAM) covers the entire surface as confirmed by atomic force microscopy (AFM) and contact angle (CA) measurements.

Using the spin casting technique, complete patterning of BCPs for each micro-well can be easily performed.

In FIG. 4, "a" is a fluorescence microscope image of 2.5 wt % PBd-PEO coated on Si microwell templates treated with PFDDTS for different times (0, 1, 4, 6 min); and line profile measurements (scale bar: 50 μm) confirming uniform and selective coating of BCP on micro-wells are shown. In FIG. 4, "b" shows the stamping time dependent coating success rate, defined as the proportion of microwells uniformly coated with BCP without residue.

Referring to a and b of FIG. 4, it can be seen that BCP patterning for each micro-well is well performed.

Processes related to i) to iv) of FIG. 2 will be described again when an experimental example is described next.

In the present invention, at least a part of the process of hydration by applying a buffer to the micro-well in which the block copolymer layer is formed may be performed while an electric field is applied above and below the micro-well in which the block copolymer layer is formed.

A method or apparatus for applying the electric field is not particularly limited, and the application of the electric field may be started in advance before the hydration process is performed.

In the present invention, not only the size but also the shape of the three-dimensional structure can be made variously, and the size and shape of the three-dimensional structure may be determined by one or more of the concentration of the BCP solution, the amplitude of the electric field, and the frequency of the electric field.

FIG. 5 is an example illustrating the determination of the surface area of BCP lamellae in individual microwells and the final size of 3DBCPM.

In FIG. 5, "a" is a schematic diagram of the fabrication of a spherical 3DBCPM. A BCP solution is injected into a microwell having a depth of a and a diameter of b, dried to form a BCP layer, and then a buffer (hydration buffer) is applied to hydrate, and 3DBCPM is formed from the BCP layer to the top of the microwell. By determining the surface area of the BCP lamellae in individual microwells, the size of the 3DBCPM can be determined.

The following is an example of how to estimate the diameter of a spherical 3DBCPM; a is the depth of the well, b is the diameter of the well, $V_{deposit}$ is the volume of the BCP layer formed in the well, $S_{well}$ is the area of the well, $S_{3D}$ is the area of the 3D structure formed outside the well, $V_{well}$ is the volume of the well, $V_{3D}$ is the volume of the three-dimensional structure formed outside the well, r is the radius of the 3D structure, d is the diameter of the 3D structure (d=2r), t is the thickness of the 3D structure, and h is the depth into the well when the shape of the 3D structure is extended to the inside of the well to be.

First, $V_{deposit}$ can be calculated through $V_{well}$, x (concentration of BCP), $D_{PEdPEO}$ and $D_{toluene}$ (PBd-PED density by element of PBd-PED solution).

Since the BCP layer covers the entire inner wall of the well and forms a three-dimensional structure on top of the well, '$V_{3D}+V_{well}=V_{deposit}$'.

In this case, it can be expressed as '$V_{3D}=S_{3D}\times t$', '$V_{well}=S_{well}\times t$'.

Accordingly, '$S_{3D}+S_{well}=V_{deposit}/t$'.

Also, $$h = r - \sqrt{r^2 - \left(\frac{b}{2}\right)^2}, \; 'S_{3D} = 4\pi r^2 - 2\pi h r',$$

and $$S_{well} = ab\pi + \left(\frac{b}{2}\right)^2.$$

where C is the correction factor.

Now, the radius r of the spherical three-dimensional structure formed outside the well can be represented by;

$$r = \frac{h + \sqrt{h^2 - \frac{4}{\pi}\left(ab\pi + \left(\frac{b}{2}\right)^2 \pi - \frac{V_{deposit}}{t} C\right)}}{4}.$$

That is, since the volume $V_{deposit}$ of the BCP layer is a function of the BCP concentration x, it can be seen that the size of the 3D structure is determined by the concentration of the BCP layer formed in the well.

In FIG. 5, "b" shows the estimated values and experimental data for the diameter of spherical 3DBCPM as a function of PBd-PEO concentration with a correction factor of 1.2 used.

In FIG. 5, "c" shows fitting of the estimate to obtain an equation for determining the diameter of a spherical 3DBCPM.

If the formation mechanism in which the 3DBCPM grows until the BCP deposited in the microwell is exhausted is simplified, the diameter d of the 3DBCPM can be expressed as in Equation 1 below. This highlights the powerful size selection capabilities. This highlights the powerful size selection capabilities.

$$d=1.14+8.7x-1.3x^2+0.1x^3 \qquad \text{[Formular 1]}$$

Where x is the concentration of the BCP solution.

FIG. 6 is an example showing a mechanism in which 3DBCPM grows according to hydration in a state in which an electric field is applied; it may occur processed such as hydration, microphase separation, lamellae formation, detachment, multilayer formation, fusion, and 3DBCPM formation.

Upon hydration with aqueous solution, the microphase separation between the hydrophilic and hydrophobic domains of the block copolymer PBd-PEO forms hexagonal hydrophobic rods surrounded by a hydrophilic layer (less than 10% hydration).

Additional hydration causes the rods to fuse into lamellae, and steric repulsion between the facing hydrophilic layers separates the lamellae.

This process is continuously repeated for each layer to form 3DBCPM. At this time, the fusion, growth and transformation of 3DBCPM can be controlled through the amplitude and frequency of the electric field.

FIG. 7 is an example of a 3DBCPM array manufactured in the form of spherical and cilia.

FIG. 7, "a" is a confocal fluorescence microscope image (left) and an enlarged cross-sectional view (right) (scale bar: 5 µm) of a spherical 3DBCPM array. One of the main shapes of 3DBCPM may be a single-layered spherical structure. These structures are rooted in microwells and maintain structural integrity with slight undulations in smooth flow.

In FIG. 7, "b" shows the size distribution of spherical 3DBCPMs produced with various BCP concentrations. At BCP concentrations of 1.5, 2.0, and 2.5 wt %, the average diameters are 12.2, 14.8, and 16.0 µm, respectively, and various sizes with a coefficient of variation of less than 13.5% were produced. indicates that one A number of micro-scale BCP structures with such a narrow size distribution could not be realized with the prior art.

In FIG. 7, "c" shows a confocal fluorescence microscope image (left) and an enlarged cross-sectional view (right) (scale bar: 5 µm) of a cilia-like 3DBCPM array, the cilia-like elongated structures are another important 3DBCPM shape that can be generated by coordinating electric fields.

These structures are thinner than the spherical structures and grow vertically upwards in the microwell.

In FIG. 7, "d" shows the length distribution of cilia-like 3DBCPMs produced with different BCP concentrations, and the average lengths were 27.4, 30.8, 38.6, and 69.1 µm for BCP concentrations of 1.5, 2.0, 2.5, and 4.0 wt %, respectively.

In FIG. 7, "e" shows 3DBCPMs with various shapes and different curvatures produced from 2.5 wt % of PBd-PEO under different conditions. where E, D, L and R represent the electric field, diameter, length and radius of 3DBCPM, respectively (scale bar: 5 µm).

FIG. 8 shows a case of reversible conformational transformation of 3DBCPM prepared with 2 wt % of PBd-PEO by controlling an electric field (scale bar: 10 µm).

FIG. 8 and e of FIG. 7 show examples of generating reversible and various shapes having a curvature of 1.1 to 9.5 µm by controlling an electric field.

FIG. 9 shows the morphological dynamics of 3DBCPM in an electric field with different amplitudes and frequencies, and explains how three factors, the concentration of the BCP solution and the amplitude and frequency of the electric field, affect the formation of 3DBCPM using the Maxwell-Wagner model.

In FIG. 9, "a" shows the morphological transformation mechanism related to the net charge distribution of 3DBCPM under an electric field. The morphological dynamics of the film with respect to the electric field applied between ITO (indium tin oxide) as an electrode and the Si template, as shown in Equation 2 below, it relates to two different time scales: the Maxwell-Wagner time scale (tMW) and the charging time scale (tc).

$$t_{MW} = \frac{\varepsilon_{in} + \varepsilon_{ex}}{\lambda_{in} + 2\lambda_{ex}}, \; t_c = RC_m\left(\frac{1}{\lambda_{in}} + \frac{1}{2\lambda_{ex}}\right)$$

Where $\varepsilon_{in}$ and $\varepsilon_{ex}$ are the dielectric constants of the inner and outer fluids, respectively, $\lambda$in and $\lambda$ex are the conductivity of the inner and outer fluids, respectively, R is the radius of 3DBCPM, and $C_m$ is the dimensionless membrane capacitance per unit area.

An electrically neutral membrane is polarized at $t_{MW}$ and charged at $t_c$. At low frequencies, a period ($t_o$) sufficiently longer than $t_c$ causes the film to charge and act as a capacitor, such that the large impedance of the film impedes the penetration of the electric field through the 3DBCPM.

As a result, the 3DBCPM is squeezed at the equator and pulled slightly along the poles by the radial Maxwell stress ($\tau_{MW}$) and pressure ($p_{MW}$) generated by the tangential electric field.

At intermediate frequencies the 3DBCPM becomes polar, but is charged due to $t_o$, which is longer than $t_{MW}$ and shorter than tc, allowing an electric field to penetrate the 3DBCPM during to and can generate tangential and normal forces ($f_\theta$ and $f_r$). These forces lead to a gradual increase in 3DBCPM along the poles.

In contrast, the effect of the electric field is negligible at high frequencies because $t_o$ is too short for the 3DBCPM to be polarized and charged.

In FIG. 9, "b" shows the theoretical modeling and experimental observation of the frequency-dependent shape dynamics of 3DBCPM, according to the above theory, 3DBCPM may have a spherical shape at a frequency of about 1 kHz or less or 1 MHz or more, and an elongated shape at a frequency between 1 kHz and 1 MHz.

In FIG. 9, "c" shows the aspect ratio change of 3DBCPM as a function of BCP concentration, as the BCP concentration increased from 1.5 wt % to 4.0 wt %, the aspect ratio rapidly increased in the frequency range of 1 kHz to 1 MHz, suggesting that the BCP concentration plays an important role in determining the aspect ratio of 3DBCPM.

In FIG. 9, "d" shows the aspect ratio change of 3DBCPM as a function of the electric field amplitude, and the electric field amplitude also has a great influence on the aspect ratio. Amplitudes less than 2.5 V could not induce elongation of 3DBCPM, whereas at sufficiently high amplitudes greater than 2.5 V the aspect ratio started to increase and saturated at different levels as a function of BCP concentration. Here, it is assumed that the saturated aspect ratio is related to the total amount of BCP deposited in the microwell.

In FIG. 9, "e" shows the morphological phase diagram of 3DBCPM related to three factors (BCP concentration, frequency and amplitude of electric field), showing the comprehensive relationship between the shape of 3DBCPM and the above-mentioned three factors.

At 1.5 wt %, the total area of 3DBCPM including ciliary, multilayered/multiple and spherical structures is the smallest among all concentrations due to the limited BCP source. All areas widened with increasing concentration, whereas at higher concentrations (4.0 wt %) it resulted in too large areas with unwanted and uncontrollable multilayer/multilayer structures, and areas of spherical structures were also eliminated.

Here, the ciliary shape represents 3DBCPM with an aspect ratio of 1.5 or more.

Meanwhile, in addition to size and shape, the stability of 3DBCPM is an important factor for biological platforms. Here, stability is a property that 3DBCPM maintains its shape, and may include properties such as structural/mechanical robustness.

In particular, unlike the spherical structure, the ciliary structure grows along the direction of the electric field and maintains its shape under the electric field. Therefore, the removal of the electric field may cause a morphological change of the formed three-dimensional structure and make it vulnerable to the external environment.

FIG. 10 shows an example of the structure and mechanical properties of a cilia-like 3DBCPM supported by a hydrogel.

In FIG. 10, "a" is a schematic diagram of a cilia-like 3DBCPM using a hydrogel as a support, in order to solve the structural fragility problem and to ensure water permeability as well as structural integrity for solution exchange in further analysis, we show that a hydrogel can be used as a support.

In FIG. 10, "b" is a confocal fluorescence microscopy image (scale bar: 5 μm) of a hydrogel-assisted 3DBCPM array, wherein injection of the hydrogel solution can decrease the aspect ratio and increase the diameter. It can be assumed that this phenomenon occurs because the amplitude of the electric field decreases due to impurities or ions present in the hydrogel solution.

In FIG. 10, "c" is a time-sequential image (scale bar: 5 μm) of cilia-like 3DBCPM with and without hydrogel support in a soft flow aqueous solution.

When the electric field disappeared in the absence of the hydrogel support, it showed non-negligible undulations in the weak flow.

However, the hydrogel-supported 3DBCPM showed negligible undulations in the weak flow even when the electric field disappeared, as confirmed by time-sequential images, and the final structure still showed high aspect ratio and excellent mechanical stability.

In FIG. 10, "d" shows the mechanical modulus of 3DBCPM with different hydrogel concentrations, and various pressures were applied to the 3DBCPM by controlling the flow rate of the aqueous solution in order to quantitatively evaluate the mechanical robustness of the hydrogel-supported 3DBCPM.

The mechanical modulus of 3DBCPM increases linearly with increasing hydrogel concentration, indicating that the addition of hydrogel effectively prevents structural deformation with a pressure of several kPa under external mechanical stimulation.

In FIG. 10, "e" shows that with the addition of the hydrogel, the lifespan of 3DBCPM improves from about 80% survival to about 100% survival for 50 days, which is about 10-fold longer than that of lipid-based structures (up to 5.5 days).

This indicates that the hydrogel-supported 3DBCPM with excellent structural/mechanical robustness can be efficiently used to mimic cellular structures and implement various biological assays.

The present invention can implement a large-scale array of three-dimensional structures, which can be adjusted in both size and shape, and stably fixed at a predefined position.

Accordingly, it can be variously applied to future biological platforms in various fields such as drug screening, biosensors, bioreactors, and cell and molecular life sciences.

FIG. 11 shows two representative biological applications based on 3DBCPM as a platform, and two cases will be described: protein-membrane interaction analysis and human intestinal organ mimicry.

In FIG. 11, "a" shows the protein-membrane interaction by introduction of EP4 protein conjugated with green fluorescent protein (GFP) and stabilized with amphiphilic poly-r-glutamic acid (APG), i) EP4 injection, ii) 3DBCPM. Insertion and adsorption of EP4 to EP4, iii) release of APG from 3DBCPM by repeated washing and desorption of adsorbed EP4, iv) shows successful introduction of EP4 to 3DBCPM.

Since the incorporation of membrane proteins into artificial membranes is an essential component of model cell membrane assays and cell-mimicking biosensors/bioreactors, there is a need to investigate the interaction of proteins with 3DBCPM.

Therefore, human prostaglandin E2 receptor 4 (EP4), a representative G protein-coupled receptor (GPCR) involved in pathological and physiological responses, was integrated into 3DBCPM.

Here, amphiphilic poly r-glutamic acid (APG) and green fluorescent protein (GFP) were used for protein stabilization/reconstitution and visualization, respectively.

APG has been demonstrated to stabilize the membrane protein in its active form in aqueous solution and aid integration into the lipid membrane, while maintaining the integrity of the membrane.

The protein stabilized with APG was incorporated into 3DBCPM by binding by hydrophobic interaction between the hydrophobic region of 3DBCPM and the non-polar alkyl chain of APG, and the reconstitution process was completed, leaving the protein in 3DBCPM through spontaneous dissociation of APG.

In FIG. 11, "b" shows cross-sectional confocal fluorescence microscopy images (top) and fluorescence intensity (bottom) of 3DBCPM without (left) and with (right) introduction of EP4. When EP4 stabilized with APG is introduced, 3DBCPM is A green fluorescence appeared.

In FIG. 11, "c" confirms the protein reconstitution in 3DBCPM by distinguishing the fluorescence intensity groups of the 3DBCPM membrane with and without EP4. The apparent difference in fluorescence intensity before and after EP4 addition, even after thorough washing and pH shock, confirms the ability of 3DBCPM to integrate with membrane proteins.

Various enzymes such as maltase-glucoamylase, sucrase-isomaltase, and lactase are present on the surface of human intestinal cilia, and they break down polysaccharides into monosaccharides, improving nutrient absorption.

In FIG. 11, "d" shows the production and operation principle of a 3DBCPM-based artificial organ, by integrating a commercially available enzyme, that is, bacterial lactase (beta-galactosidase, β-Ga), into the cilia prepared by the present invention, Represents an imitation of an intestinal organ.

In d of FIG. 11, i) is 1 mol % of 1,2-distearoyl-sn-glycero-3-phosphoethanolamine-N-[succinimidyl(polyethylene glycol)] (DSPE-PEG-NHS) in 3DBCPM, ii) is NHS and 1 Coupling of -ethyl-3-(3-dimethylaminopropyl)carbodiimide (EDC), iii) conjugation of β-Ga, iv) fluorescein di-β-D-galactopyranoside (FDG) is hydrolyzed to galactose by β-Ga Represents an enzymatic reaction that releases a GFP molecule that is degraded to increase fluorescence.

In FIG. 11, "e" compares the time-dependent enzyme kinetics of the proposed spherical and ciliary 3DBCPM and planar BCP structures by monitoring normalized fluorescence intensity after enzymatic reaction.

β-Ga bound lipids increase fluorescence by incorporation of 1 mol % hydrolyzed FDG into 3DBCPM as galactose and GFP.

Overall, the ciliary structure showed the fastest increase in fluorescence intensity. It can be assumed that the large surface area of the ciliary structures accommodates much more β-Ga than other structures and reacts frequently with FDG.

The reaction rate constant can be estimated according to the first-order reaction $P=P=P_0e^{kt}$ where P is the concentration of the reactants, $P_0$ is the initial concentration of the reactants, k is the rate constant, and t is the time.

In FIG. 11, "f" shows the estimated enzymatic reaction rate constants and surface area normalization rate constants of three different BCP structures (planar, spherical, and cilia), cilia exhibited the highest reaction rate constant even when the rate constant was normalized by the surface area.

It can be assumed that these results originate from the 3D architecture that favors active and effective response as well as the large surface area mentioned above. And we highlight the potential of 3DBCPM, especially cilia, as a highly responsive platform for a variety of applications in fields such as artificial organs, biosensors, and drug screening.

FIG. 12 shows a summary of 3D block copolymer artificial cell membranes (3DBCPMs) for various biological applications, prepared in accordance with the present invention.

In FIG. 12, "a" is a representative biological application, such as protein-membrane analysis using EP4 and artificial intestinal organs using β-galactosidase-tagged lipids, using a diblock copolymer, i.e., PBd-PEO as a building block, to form silicone (Si) An electric field-assisted self-assembly method capable of fabricating 3DBCPMs with various shapes and sizes, high stability and in vivo functions on microwell templates is summarized and presented.

It has been shown that the size of the three-dimensional structure can be controlled by controlling the concentration of the BCP solution, and the shape can be controlled by controlling the electric field. The packing parameter p is a polymer-specific value related to the volume and length of the hydrophobic domain and the optimal area of the hydrophilic domain.

In FIG. 12, "b" is a fluorescence microscopy image of a ciliated long 3DBCPM array generated from a template, clearly showing a very elongated structure of similar shape upright along the z-axis of the template.

In FIG. 12, "c" is a cross-sectional transmission electron microscope (TEM) image of a single-layer 3DBCPM composed of a bilayer film with a thickness of 10 nm or less.

The confirmed thickness (~10 nm) of the PBd-PEO bilayer suggests that 3DBCPM exhibits biological functions, and has various biological applications in drug screening, biological analysis, biosensing, etc.

Although the present invention has been illustrated and described in relation to specific preferred embodiments, the present invention may be modified and changed in various ways without departing from the technical features or fields of the present invention provided by the following claims. It will be apparent to those of ordinary skill in the art.

The invention claimed is:

1. A block copolymer-based three-dimensional polymorphic artificial structure manufacturing method comprising the steps of:

forming a micro-well array on a substrate;

forming a block copolymer layer by injecting a block copolymer (BCP) solution into each micro-well of the micro well array and drying the micro-well array;

forming a three-dimensional structure from the block copolymer layer to the top of each micro-well by applying a buffer to each micro-well in which the block copolymer layer is formed, wherein at least a part of a hydration process is carried out under an electric field applied between the top and bottom of the micro-well in which the block copolymer layer is formed.

2. The method of claim 1, wherein the block copolymer solution comprises polybutadiene-b-polyethylene oxide (PBd-PEO).

3. The method of claim 1, wherein the buffer comprises a sucrose solution at a certain concentration.

4. The method of claim 1, wherein a size and a shape of the three-dimensional polymorphic artificial structure are determined by at least one of a concentration of the block copolymer solution, an amplitude of the electric field, and a frequency of the electric field.

5. The method of claim 1, further comprising enhancing a stability of the formed three-dimensional polymorphic artificial structure.

6. The method of claim 5, wherein the step of enhancing a stability of the three-dimensional structure comprises a process of injecting and curing a hydrogel solution around the three-dimensional polymorphic artificial structure after the three-dimensional structure is formed.

7. The method of claim 6, wherein the process of injecting and curing the hydrogel solution around the three-dimensional polymorphic artificial structure is carried out in a state in which the electric field is applied.

8. The method of claim 1, wherein a diameter (d) of the three-dimensional polymorphic artificial structure is determined by the following formula, where the concentration of the block copolymer solution is x:

$$d=1.14+8.7x-1.3x^2+0.1x^3.$$

9. The method of claim 1, wherein a frequency of the electric field is controlled to a value greater than or equal to a first frequency and less than or equal to a second frequency when a shape of the three-dimensional polymorphic artificial structure is formed in a ciliary shape, and is controlled to a value less than the first frequency or greater than the second frequency when the shape of the three-dimensional polymorphic artificial structure is formed in a spherical shape, wherein the ciliary type refers to a shape with an aspect ratio of 1.5 or more, and the first frequency is less than the second frequency.

10. The method of claim 9, wherein the first frequency is 1 kHz, and the second frequency is 1 MHz.

\* \* \* \* \*